United States Patent
Ghods et al.

(10) Patent No.: US 8,326,814 B2
(45) Date of Patent: Dec. 4, 2012

(54) WEB-BASED FILE MANAGEMENT SYSTEM AND SERVICE

(75) Inventors: Sam Ghods, San Francisco, CA (US); Florian Jourda, Pollionnay (FR)

(73) Assignee: Box, Inc., Los Altos, CA (US)

( * ) Notice: Subject to any disclaimer, the term of this patent is extended or adjusted under 35 U.S.C. 154(b) by 470 days.

(21) Appl. No.: 12/260,533

(22) Filed: Oct. 29, 2008

(65) Prior Publication Data

US 2009/0150417 A1 Jun. 11, 2009

Related U.S. Application Data

(60) Provisional application No. 60/992,656, filed on Dec. 5, 2007, provisional application No. 61/055,901, filed on May 23, 2008.

(51) Int. Cl.
*G06F 17/30* (2006.01)
(52) U.S. Cl. ....................................... 707/703
(58) Field of Classification Search ................. 707/2, 3, 707/703; 711/100
See application file for complete search history.

(56) References Cited

U.S. PATENT DOCUMENTS

| | | | |
|---|---|---|---|
| 5,999,908 A | 12/1999 | Abelow | |
| 6,289,345 B1 | 9/2001 | Yasue | |
| 6,584,466 B1 * | 6/2003 | Serbinis et al. | 715/209 |
| 6,636,872 B1 | 10/2003 | Heath et al. | |
| 6,714,968 B1 | 3/2004 | Prust | |
| 6,735,623 B1 | 5/2004 | Prust | |
| 6,952,724 B2 | 10/2005 | Prust | |
| 7,069,393 B2 | 6/2006 | Miyata et al. | |
| 7,133,834 B1 | 11/2006 | Abelow | |
| 7,149,787 B1 | 12/2006 | Mutalik et al. | |
| 7,222,078 B2 | 5/2007 | Abelow | |
| 7,275,244 B1 * | 9/2007 | Charles Bell et al. | 717/168 |
| 7,543,000 B2 | 6/2009 | Castro et al. | |
| 7,620,565 B2 | 11/2009 | Abelow | |
| 8,140,513 B2 | 3/2012 | Ghods et al. | |
| 2002/0133509 A1 | 9/2002 | Johnston et al. | |

(Continued)

FOREIGN PATENT DOCUMENTS

KR 20020017444 A 3/2002

(Continued)

OTHER PUBLICATIONS

International Search Report PCT/US2008/012973 dated Apr. 30, 2009, pp. 1-3.

(Continued)

*Primary Examiner* — Etienne LeRoux
(74) *Attorney, Agent, or Firm* — Perkins Coie LLP

(57) ABSTRACT

A system and method for integrating a plurality of web-based applications with a web-based file management system. The web-based application may provide a service to the users of the web-based file management system, such that the web-based application can interact with the files of said users. The integration of the service of the web-based application with the web-based file management system is achieved through a simple web interface to configure the service, without the developer of the web-based application having to change the application programming interface (API) of the application. The user of the web-based file management system may add services of a plurality of available web-based applications and use these services with one or more files that are stored on the web-based file management system.

18 Claims, 11 Drawing Sheets

U.S. PATENT DOCUMENTS

| | | | |
|---|---|---|---|
| 2003/0093404 A1 | 5/2003 | Bader et al. | |
| 2004/0111415 A1 | 6/2004 | Scardino et al. | |
| 2004/0128359 A1 | 7/2004 | Horvitz et al. | |
| 2004/0246532 A1* | 12/2004 | Inada | 358/402 |
| 2005/0005276 A1 | 1/2005 | Morgan | |
| 2005/0050228 A1 | 3/2005 | Perham et al. | |
| 2005/0114378 A1 | 5/2005 | Elien et al. | |
| 2006/0053088 A1 | 3/2006 | Ali et al. | |
| 2006/0174051 A1* | 8/2006 | Lordi et al. | 710/314 |
| 2006/0174054 A1* | 8/2006 | Matsuki | 711/100 |
| 2006/0265719 A1 | 11/2006 | Astl et al. | |
| 2006/0271510 A1 | 11/2006 | Harward et al. | |
| 2007/0016680 A1* | 1/2007 | Burd et al. | 709/227 |
| 2007/0126635 A1* | 6/2007 | Houri | 342/451 |
| 2007/0214180 A1* | 9/2007 | Crawford | 707/104.1 |
| 2007/0283443 A1 | 12/2007 | McPherson et al. | |
| 2008/0077631 A1 | 3/2008 | Petri | |
| 2008/0133674 A1 | 6/2008 | Knauerhase et al. | |
| 2008/0151817 A1 | 6/2008 | Fitchett et al. | |
| 2009/0019093 A1 | 1/2009 | Brodersen et al. | |
| 2009/0132651 A1 | 5/2009 | Roger et al. | |
| 2009/0198772 A1 | 8/2009 | Kim et al. | |
| 2009/0210459 A1 | 8/2009 | Nair et al. | |
| 2009/0235167 A1 | 9/2009 | Boyer et al. | |
| 2009/0254589 A1 | 10/2009 | Nair et al. | |
| 2010/0036929 A1 | 2/2010 | Scherpa et al. | |
| 2010/0198783 A1 | 8/2010 | Wang et al. | |
| 2011/0055721 A1 | 3/2011 | Jain et al. | |
| 2011/0161289 A1 | 6/2011 | Pei et al. | |

FOREIGN PATENT DOCUMENTS

| | | |
|---|---|---|
| KR | 20060070306 A | 6/2006 |
| KR | 20060114871 A | 11/2006 |
| WO | WO-2006028850 A2 | 3/2006 |

OTHER PUBLICATIONS

Written Opinion PCT/US2008/012973 dated Apr. 30, 2009, pp. 1-4.
U.S. Appl. No. 13/152,982, filed Jun. 3, 2011, Ghods et al.
U.S. Appl. No. 13/166,733, filed Jun. 22, 2011, Seibert et al.
U.S. Appl. No. 13/030,090, filed Feb. 17, 2011, Ghods et al.
U.S. Appl. No. 13/165,725, filed Jun. 21, 2011, Trombley-Shapiro et al.
U.S. Appl. No. 13/208,615, filed Aug. 12, 2011, Lee et al.
Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search PCT/US2011/041308 dated Feb. 27, 2012, pp. 1-2.
U.S. Appl. No. 60/992,656, filed Dec. 5, 2007, Methods and Systems for Open Source Collaboration in an Application Service Provider Environment.
U.S. Appl. No. 61/055,901, filed May 23, 2008, Methods and Systems for Open Source Collaboration in an Application Service Provider Environment.
U.S. Appl. No. 13/030,090, filed Feb. 17, 2011, Methods and Systems for Open Source Collaboration in an Application Service Provider Environment.
U.S. Appl. No. 61/434,815, filed Jan. 20, 2011, Real Time Notifications of Activity and Real-Time Collaboration in a Cloud-Based Environment with Applications in Enterprise Settings.
U.S. Appl. No. 13/166,733, filed Jun. 22, 2011, Multimedia Content Preview Rendering in a Cloud Content Management System.
U.S. Appl. No. 61/506,013, filed Jul. 8, 2011, Collaboration Sessions in a Workspace on a Cloud-Based Content Management System.
U.S. Appl. No. 61/592,394, filed Jan. 30, 2012, Extended Applications of Multimedia Content Previews in the Cloud-Based Content Management System.
U.S. Appl. No. 61/538,782, filed Sep. 23, 2011, Central Management and Control of User-Contributed Content in a Web-Based Collaboration Environment and Management Console Thereof.
U.S. Appl. No. 61/505,999, filed Jul. 8, 2011, Desktop Application for Access and Interaction with Workspaces in a Cloud-Based Content Management System and Synchronization Mechanisms Thereof.
U.S. Appl. No. 13/282,427, filed Oct. 26, 2011, Desktop Application for Access and Interaction with Workspaces in a Cloud-Based Content Management System and Synchronization Mechanisms Thereof.
U.S. Appl. No. 61/564,425, filed Nov. 29, 2011, Mobile Platform Folder Synchronization and Offline Synchronization.
U.S. Appl. No. 61/568,430, filed Dec. 8, 2011, Mobile Platform File and Folder Selection Functionalities for Offline Access and Synchronization.
U.S. Appl. No. 61/579,551, filed Dec. 22, 2011, System Status Monitoring and Data Health Checking in a Collaborative Environment.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
U.S. Appl. No. 61/434,810, filed Jan. 20, 2011, Real Time Notifications of Activity and Real-Time Collaboration in a Cloud-Based Environment with Applications in Enterprise Settings.
U.S. Appl. No. 13/412,549, filed Mar. 5, 2012, Methods and Systems for Open Source Collaboration in an Application Service Provider Environment.
U.S. Appl. No. 13/152,982, filed Jun. 3, 2011, Real Time Notification of Activities that Occur in a Web-Based Collaboration Environment.
U.S. Appl. No. 13/116,733, filed Jun. 22, 2011, Multimedia Content Preview Rendering in a Cloud Content Management System.
U.S. Appl. No. 61/551,894, filed Oct. 26, 2011, Enhanced Multimedia Content Preview Rendering in a Cloud Content Management System.
U.S. Appl. No. 13/297,230, filed Nov. 15, 2011, Enhanced Multimedia Content Preview Rendering in a Cloud Content Management.
U.S. Appl. No. 61/592,567, filed Jan. 30, 2012, Preview Pre-Generation Based on Heuristics and Algorithmic Prediction/Assessment of Predicted User Behavior For Enhancement of User Experience.
U.S. Appl. No. 13/208,615, filed Aug. 12, 2011, Collaboration Sessions in a Workspace on a Cloud-Based Content Management System.
U.S. Appl. No. 13/274,268, filed Oct. 14, 2011, Automatic and Semi-Automatic Tagging Features of Work Items in a Shared Workspace For Metadata Tracking in a Cloud-Based Content Management System With Selective or Optional User Contribution.
U.S. Appl. No. 61/538,782, filed Sep. 23, 2011, Central Management and Control of User-Contributed Content in a Web-Based Collaboration Enviroment and Management Console Thereof.
U.S. Appl. No. 13/547,264, filed Jul. 12, 2012, Central Management and Control of User-Contributed Content in a Web-Based Collaboration Evironment and Management Console Thereof.
U.S. Appl. No. 13/165,725, filed Jun. 21, 2011, Batch Uploading of Content to a Web-Based Collaboration Environment.
U.S. Appl. No. 13/282,427, Oct. 23, 2011, Desktop Application for Access and Interaction with Workspaces in a Cloud-Based Content Management System and Synchronization Mechanisms Thereof.
U.S. Appl. No. 61/554,450, filed Nov. 1, 2011, Platform and Application Independent Method For Document Editing and Version Tracking Via a Web Browser.
U.S. Appl. No. 13/332,319, filed Dec. 20, 2011, Platform and Application Independent System and Method For Networked File Access and Editing.
U.S. Appl. No. 13/414,480, filed Mar. 7, 2012, Universal File Type Preview For Mobile Devices.
U.S. Appl. No. 13/345,502, filed Jan. 6, 2012, System and Method For Actionable Event Generation For Task Delegation and Management Via a Discussion Forum in a Web-Based Collaboration Environment.
U.S. Appl. No. 13/619,439, filed Sep. 14, 2012, Batching Notifications Of Activities That Occur in a Web-Based Collaboration Environment.
U.S. Appl. No. 61/560,685, filed Nov. 16, 2011, Temporal and Spatial Processing and Tracking Of Events in a Web-Based Collaboration Environment For Asynchronous Delivery in an Ordered Fashion.

U.S. Appl. No. 13/524,501, filed Jun. 15, 2012, Resource Effective Incremental Updating of a Remote Client With Events Which Occurred Via a Cloud-Enabled Platform.

U.S. Appl. No. 13/526,437, filed Jun. 18, 2012, Managing Updates At Clients Used by a User to Access a Cloud-Based Collaboration Service.

U.S. Appl. No. 61/579,551, filed Dec. 22, 2001, System Status Monitoring and Data Health Checking in a Collaborative Environment.

U.S. Appl. No. 13/464,813, filed Apr. 4, 2012, Health Check Services for Web-Based Collaboration Environments.

U.S. Appl. No. 13/405,164, filed Feb. 24, 2012, System and Method for Promoting Enterprise Adoption of a Web-Based Collaboration Environment.

U.S. Appl. No. 13/431,645, filed Mar. 27, 2012, Cloud Service or Storage Use Promotion Via Partnership Driven Automatic Account Upgrades.

U.S. Appl. No. 61/620,554, filed Apr. 5, 2012, Device Pinning Capability for Enterprise Cloud Service and Storage Accounts.

U.S. Appl. No. 13/493,922, filed Jun. 11, 2012, Device Pinning Capability for Enterprise Cloud Service and Storage Accounts.

U.S. Appl. No. 61/649,869, filed Mar. 21, 2012, Selective Application Access Control Via a Cloud-Based Service for Security Enhancement.

U.S. Appl. No. 13/493,783, filed Jun. 11, 2012, Security Enhancement Through Application Access Control.

U.S. Appl. No. 13/618,993, filed Sep. 14, 2012, Cloud Service Enabled to Handle a Set of Files Depicted to a User As a Single File in a Native Operating System.

U.S. Appl. No. 61/667,909, Jul. 3, 2012, Highly Available Ftp Servers for a Cloud-Based Service.

U.S. Appl. No. 13/565,136, filed Aug. 2, 2012, Load Balancing Secure Ftp Connections Among Multiple Ftp Servers.

* cited by examiner

Home   My Files   Updates   Collaborators   Services

You are currently in developer mode. Return to OpenBox as regular user.
View the OpenBox documentation or contact us for questions or bug reports.

Step 1. Create an OpenBox Service ?

OpenBox enables Box.net users to send their data to and from your web or software application, or service. By using our simple API, you can be accepting data from Box users in no time. Please complete the following details to start using the OpenBox platform.

General information:

| | | |
|---|---|---|
| Service name: | [          ] | Ex: Zoho |
| Service description: | [          ] | Ex: Zoho is an online producitivity suite |
| Support email: | [          ] | Ex: support@zoho.com |
| Website URL: | [          ] | Ex: http://zoho.com |
| URL of service description page: | (will be generated once service is saved) | Page that will show the detail of this service to Box users. You can link to it from your website |
| Display in public service directory: | ⦿ No<br>○ Yes (pending Box.net approval) | If displayed in the public directory, your service will be visible to all Box users. Otherwise, it will be accessible only to users that know the service description page url. |

Trademark images of the service:

| | | |
|---|---|---|
| Logo: | No logo uploaded | Displayed in services directory |
| Upload new logo: | [          ][Browse...] | Will be resized to 100x80 |
| Favicon: | No favicon uploaded | Displayed in front of every action of the service, notably in drop down menu of files |
| Upload new favicon: | [          ][Browse...] | Will be resized to 16x16 (.ico not accepted) |

Screenshots of the service:

| | | |
|---|---|---|
| Upload new screenshot: | [          ][Browse...] | Will be resized to 570x570 |
| Add description to new screenshot: | [          ] | |

Developers that can edit this service:

1. NTraitler@perkinscoie.com

| | | |
|---|---|---|
| Add a developer: | [          ] | Email of a Box user that will be granted right to edit this service (limited to 5 people) |

Backend parameters:

| | | |
|---|---|---|
| Api Key: | (will be generated once service is saved) | Common api key for all actions Used to access Box.net APIs |

Service actions: ?

No action created
(you will be able to create new actions once service is saved)

Continue    Cancel

Tip: Upload documents to your Box and then edit them from any web browser!

© Box.net, 2005-2008  About Us  Contact Us  Jobs  Blog  Affiliate Program  Developers  Privacy Policy  Terms  Partner With Us  FTP

FIG. 10

FIG. 11

WEB-BASED FILE MANAGEMENT SYSTEM AND SERVICE

RELATED APPLICATIONS

This application claims priority to: U.S. Provisional Patent Application No. 60/992,656, filed Dec. 5, 2007, entitled "METHODS AND SYSTEMS FOR OPEN SOURCE COLLABORATION IN AN APPLICATION SERVICE PROVIDER ENVIRONMENT" by Florian Jourda et al; U.S. Provisional Patent Application No. 61/055,901, filed May 23, 2008, entitled "METHODS AND SYSTEMS FOR OPEN SOURCE INTEGRATION" by Sam Ghods; each of which is incorporated herein by reference.

BACKGROUND

A server, or service class computing device, may be used to store files and to provide a website interface for one or more users of this website to access the files. An application developer may wish to make a service available to users of the website. This would allow the users to use the developer's application with the users' files.

In implementing a developer's service through an external website, one approach taken has been for the developer to make alterations to the application programming interface (API) of the software providing the service in order to enable the external software to communicate with the API of the developer's service. Significant resources and time may be required to implement the service through the external website by changing the API of the application providing the service. The developer is typically required to modify the API in a specific way to enable the application to send and accept data to and from the external application.

A provider of a website for file storage, sharing and collaboration may wish to make a plurality of services available to the users. Such users can then access the plurality of services from a single location to use with their files. The provider of the website may therefore wish to facilitate integration of services with its website.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique provides an API-agnostic method and system for integrating a web-based file management system with one or more web-based applications to allow users of the web-based file management system to use the web-based application with files stored on the web-based file management system.

A system based on the technique may include a server storing one or more files of one or more users and providing a website for software developers to integrate their application with the website. This would make the application available to users of the website to use with the files stored on the web-based file management system.

A method based on the technique may include transmitting files from the web-based file management system to the web-based application along with a command structure of the API of the web-based application.

An integration engine allows a web-based file management system to provide an interface for an application developer to integrate a service in the web-based file management system, advantageously without the developer having to alter an API of the application providing the service. The integration engine acts as an intermediate between the web-based file management system and the web-based application, allowing them to communicate between each other.

A configuration interface on the web-based file management system provides a way for the developer to set up a service that acts on one or more files of a user of a web-based file management system, upon request of the user. The configuration parameters are stored on the web-based file management system and used whenever the service is requested by a user of the web-based file management system to act on a file stored on the web-based file management system.

A user interface allows a user of a web-based file management system to send, edit or view files that are stored on the web-based file management system with an external application.

BRIEF DESCRIPTION OF THE DRAWINGS

FIG. 10 depicts an example of a configuration interface, wherein a developer can enter values for a set of parameters to create a service.

FIG. 11 depicts an example of a configuration interface, wherein a developer can enter values for a set of parameters to create an action.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

A technique provides integration between a computer system storing files, a web based file management system (WBFMS), and a web based application (WBA). The WBA is operable to modify a file, perform another action with the file, or provide some other service. An application developer configures the WBA through an interface to integrate a service into the WBFMS to use the WBA, advantageously, without the application developer having to alter an application programmer interface (API) of the WBA.

An application programming interface (API) may be defined as a set of instructions programmable to cause a WBA to respond to one or more commands. An application or an individual may provide commands in accordance with the API to cause the WBA to perform an action.

To "send a file" includes at least one of the following and may include a combination of the following: send a copy of a file, send an indirection, link, or pointer to the file, send information about the file, or send a part or parts of the file.

Figure 1:
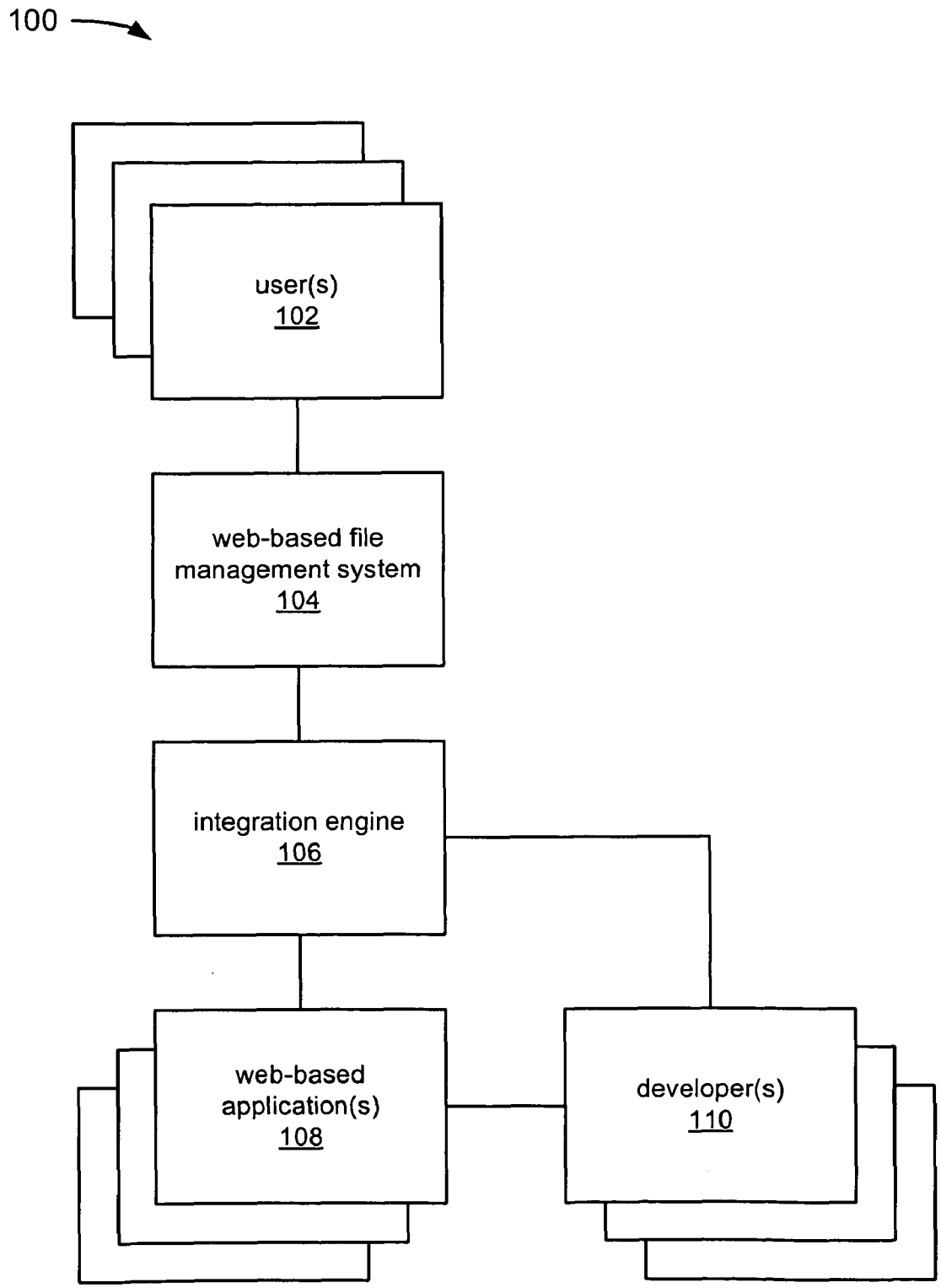
FIG. 1 depicts an example of a system for integrating a web-based file management system (WBFMS) with a web-based application (WBA).

FIG. 1 depicts a diagram 100 of an example of a method for API-agnostic integration of two software providers. FIG. 1 includes user(s) 102, web-based file management system (WBFMS) 104, integration engine 106, web-based application (WBA) 108 and developer(s) 110.

In the example of FIG. 1, the user 102 may be an individual or machine acting on behalf of an individual, having access to the internet through a computing device. As an individual, the user 102 may use an internet browser window, such as Internet Explorer or Mozilla Firefox to access the internet.

In the example of FIG. 1, the WBFMS 104 may provide online storage where users of the WBFMS 104 can store their files. The WBFMS 104 may also provide for file sharing and collaboration among users, as well as application services provided locally. The WBFMS 104 may include any computer readable medium capable of storing data. The WBFMS 104 may provide a user interface through which users can access and manage files stored on the WBFMS 104.

In the example of FIG. 1, the integration engine 106 includes a processor executing instructions operable to provide commands to a WBA 108. The integration engine 106 may include an interface for configuring one application to work with the other.

In the example of FIG. 1, the WBA 108 may be software providing services to users through the internet. These services may, in a non-limiting example, include modifying or viewing a file or sending it via fax.

In the example of FIG. 1, the developer(s) 110 may be an individual, organization, or machine acting on behalf of an individual or organization, involved in the development process of an application. The developer(s) 110 may have knowledge of the API of the application.

The user 102 may access the WBFMS 104 via a computing device connected to the internet. The WBFMS 104 may provide online storage wherein users can store files. The user 102 may then upload files to the WBFMS 104 or view files already stored on the WBFMS 104. Files stored on the WBFMS 104 may be used with the WBA 108 via an integration engine 106. The developer(s) 110 are connected to the WBA 108 and to the integration engine 106. The developer(s) 110 may configure the integration engine 106, such that the WBA 108 can integrate with the WBFMS 104, without having to change the API of the service provided by the WBA 108. Integration will be discussed in further detail below, however, as a limited introduction, such configuration typically includes transmitting commands to the integration engine 106 for the integration engine 106 to provide to the WBA 108 along with a file. Upon a request from the user 102 of the WBFMS 104, the integration engine 106 sends the requested file along with a command structure of the API of the WBA 108 to the WBA 108.

Figure 2:
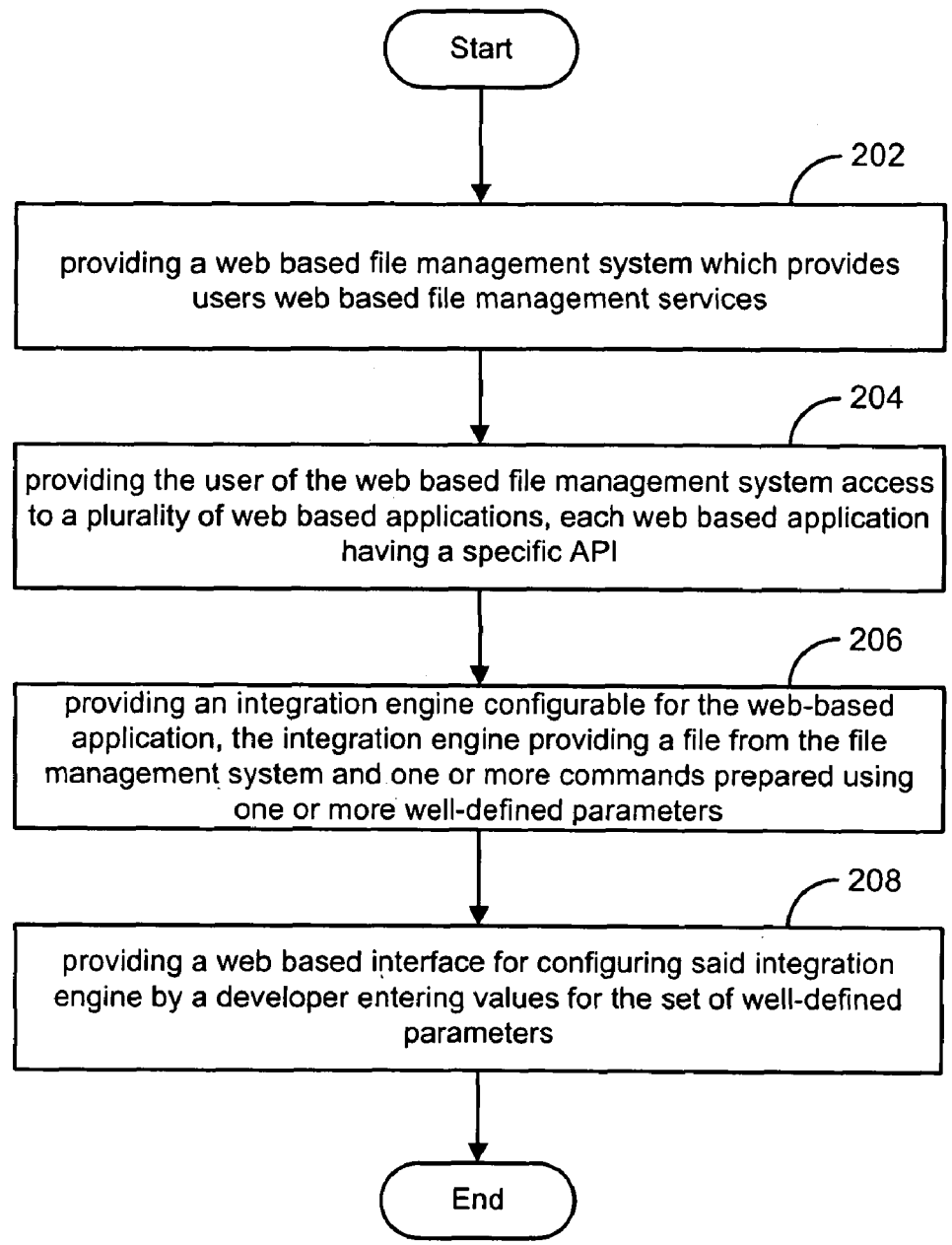
FIG. 2 depicts an example of a flowchart of an API-agnostic method for providing a plurality of WBAs to a user of a WBA.

FIG. 2 depicts an example of a flowchart of an API-agnostic method for providing a plurality of WBAs to a user of a WBA.

In the example of FIG. 2, the flowchart starts at module 202 with providing a web based file management system which provides users web-based file management services. These services may include storing files and providing access to these files to users of the WBFMS.

In the example of FIG. 2, the flowchart continues to module 204 with providing the user of the web-based file management system access to a plurality of web-based applications, each web-based application having a specific API. These WBAs may be used on files stored on the WBFMS and may, in a non-limiting example include modifying or viewing the file.

In the example of FIG. 2, the flowchart continues to module 206 with providing an integration engine configurable for the web-based application, the integration engine providing a file from the file management system and one or more commands prepared using one or more well-defined parameters.

In the example of FIG. 2, the flowchart continues to module 208 with providing a web-based interface for configuring the integration engine by a developer entering values for the set of well-defined parameters. Having provided a web-based interface, the flowchart terminates.

Figure 3:
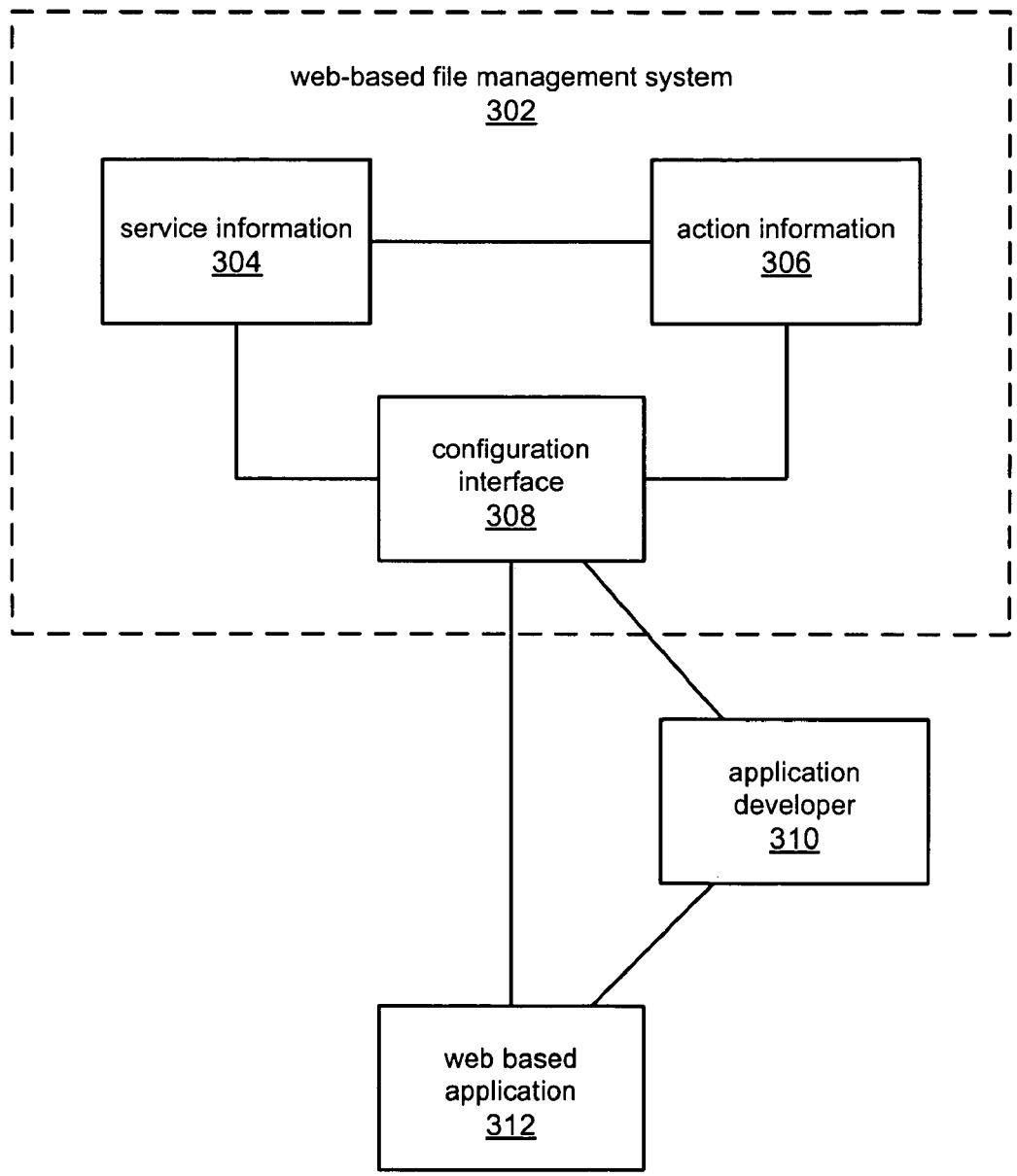
FIG. 3 depicts an example of a system allowing a developer of a web-based application to integrate a service and an action with a web-based file management system through an interface of the web-based file management system.

FIG. 3 depicts an example of a system 300 allowing a developer of a web-based application (WBA) to integrate a service and an action with a web-based file management system through an interface of the web-based file management system (WBFMS).

In the example of FIG. 3, WBFMS 302 includes service information 304, action information 306, and configuration interface 308.

In the example of FIG. 3, the service information 304 may include, but is not limited to, any combination of the following: the name of the service, a description, email contact information for support, a URL to the service description page, access control parameters, one or more pictures identifying the service, and an API key.

The API key is generated by the WBFMS 302 and is used for all actions of the WBA 312 that access the API of the WBFMS 302. In a non-limiting example, the WBA 312 can perform the following functions using the API of the WBFMS 302: store and retrieve files from the WBFMS 312, organize files into folders, move, rename or delete files, and share files.

The access control parameters may define whether the service defined by the service information 304 is visible to all users of the WBFMS 302, or whether it is only accessible to users that know the URL of the service description page.

In the example of FIG. 3, the action information 306 may include, but is not limited to, any combination of the following: a name of the action, a description, a list of supported file extensions, permission information, a command language, a command address, a command response address, one or more commands, and a security parameter.

The permission information defines the availability of an action for shared files on the WBFMS 302. The command language may be specified and is the computer language in which the command of the API is transmitted from one program to another. The security parameters determine whether or not access authentication is required to access the WBA 312.

In the example of FIG. 3, the configuration interface 308 may be a web interface such as an extensible hypertext markup language (XHTML)/hypertext markup language (HTML) form wherein data can be entered.

In the example of FIG. 3, the application developer 310 may be an individual, organization, or machine acting on behalf of an individual or organization, involved in the development process of an application.

In the example of FIG. 3, the WBA 312 may be a computing device executing instructions to provide services to users through the internet. These services may, in a non-limiting example, include modifying or viewing an image file or sending a file by fax.

In the example of FIG. 3, the service information 304 may be provided by the application developer 310 through the configuration interface 308. This information may be stored on a server of the WBFMS 302. The application developer 310 may use the configuration interface 308 to provide the action information 306. This information is then stored on the WBFMS 302. To enable the WBA 312 to accept data from the WBFMS 302, the developer 310 may use the configuration interface 308 to define the commands that are sent and received to and from the WBFMS 302.

Figure 4:
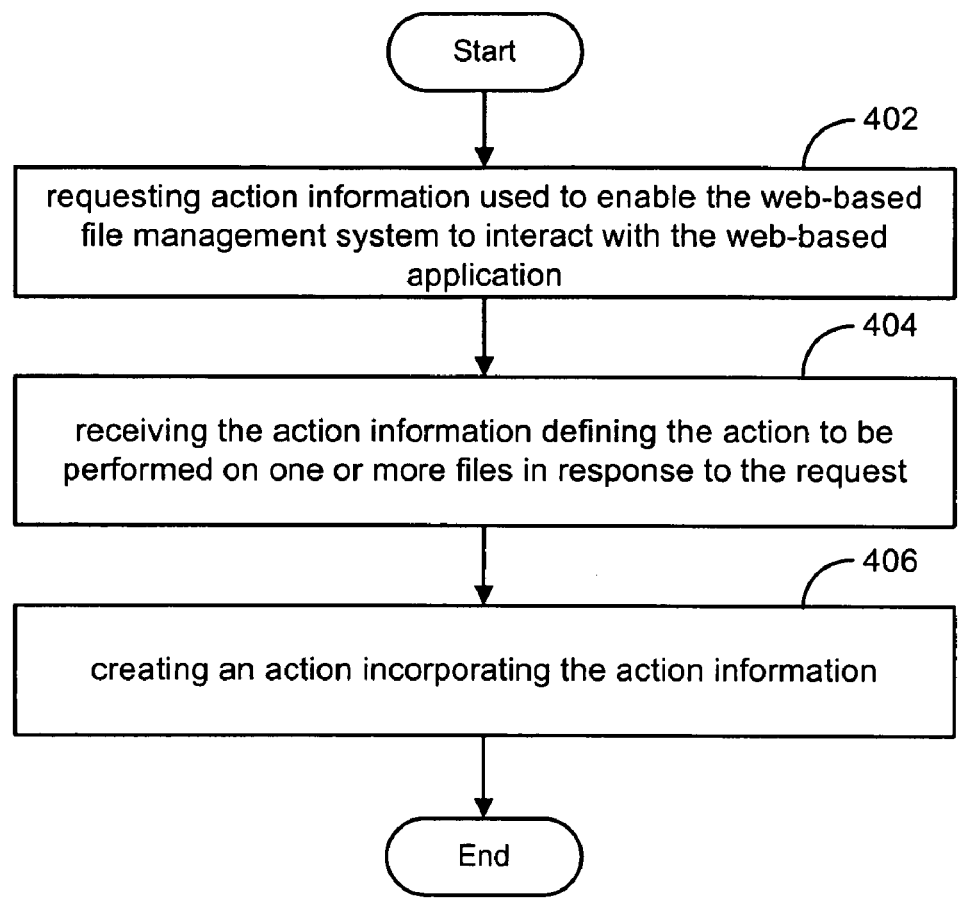
FIG. 4 depicts an example of a flowchart of a method for configuring an action enabling files stored on a web-based file management system to interact with a web-based application.

FIG. 4 depicts a flowchart 400 of an example of a method for configuring an action enabling files stored on a web-based file management system to interact with a web-based application.

In the example of FIG. 4, the flowchart starts at module 402 with requesting action information used to enable the web-based file management system to interact with the web-based application. The WBFMS may send this request to a developer of a WBA wishing to set up a service of the WBA for users of the WBFMS.

In the example of FIG. 4, the flowchart continues to module 404 with receiving the action information to be performed on one or more files in response to the request. The developer of the WBA may provide the action information, which may then be sent to the WBFMS.

In the example of FIG. 4, the flowchart continues to module 406 with creating an action incorporating the action information. This information may then be stored on the WBFMS. Having created the action, the flowchart terminates.

Figure 5:
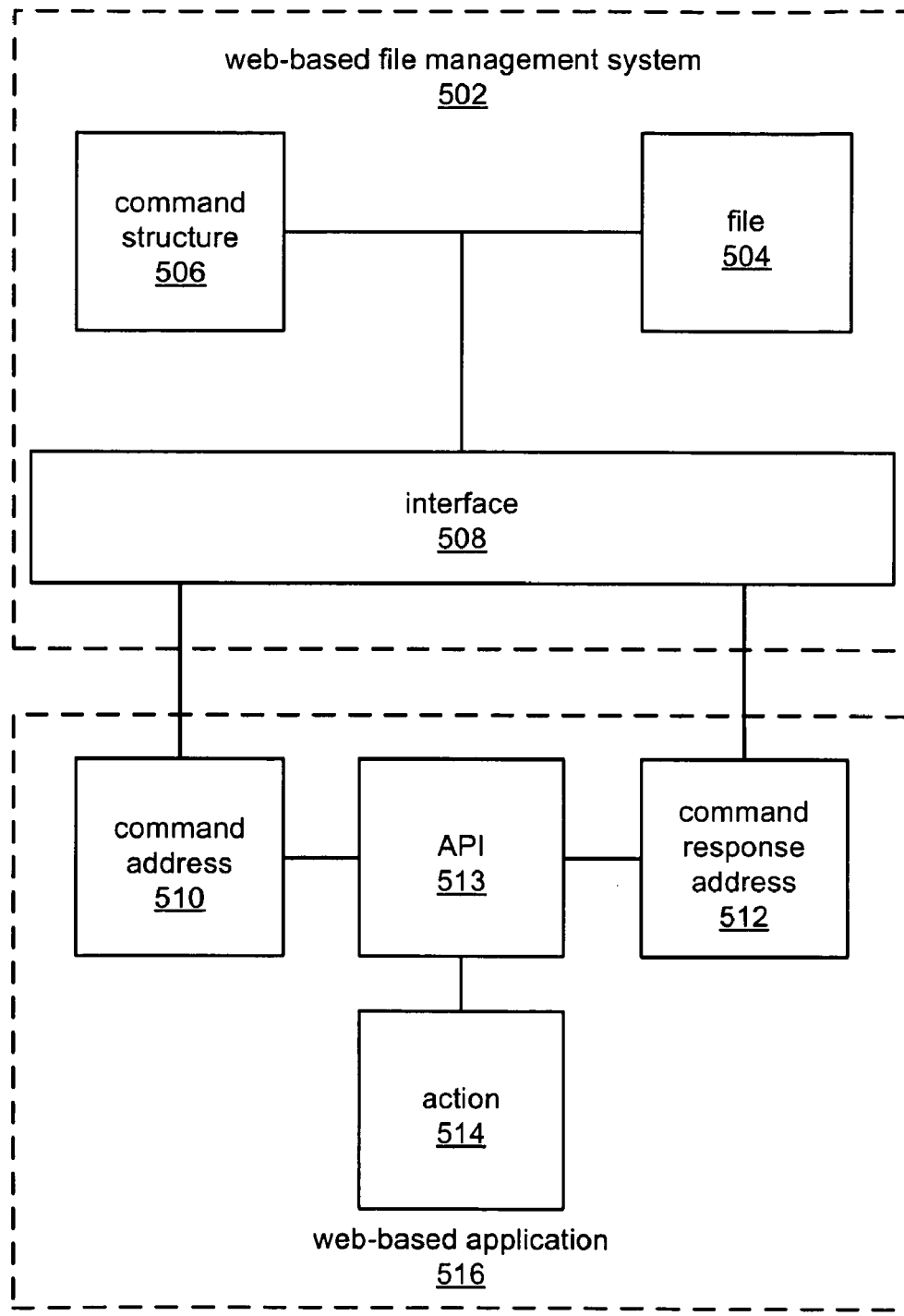
FIG. 5 depicts an example of a system for integrating a web-based file management system with an API of a web-based application.

FIG. 5 depicts a diagram 500 of an example of a method for integrating a web-based file management system with an API of a web-based application. FIG. 5 includes web-based file management system 502, and web-based application 516.

In the example of FIG. 5, web-based file management system 502 includes command structure 506, file 504 and interface 508. In the example of FIG. 5, web-based application 516 includes command address 510, command response address 512, API 513, and action 514.

In the example of FIG. 5, the command structure 506 may include code lines in the language of the API 513 of the web based application 516. The code lines can that provides the functionality described by the API 513.

In the example of FIG. 5, the file 504 may be a sequence of binary digits that can be read by a computer program, and can, in a non-limiting example, be presented to a user as, for example, text, an image, a presentation, or another known or convenient item.

In the example of FIG. 5, the interface 508 is a device that provides communication between information processing systems. The interface 508 may send data to an information processing system, and receive data from the information processing system.

In the example of FIG. 5, the command address 510 may be given by a Uniform Resource Locator (URL).

In the example of FIG. 5, the command response address 512 may be given by a Uniform Resource Locator (URL).

In the example of FIG. 5, the API 513 is an interface enabling computer programs to interact between each other. The API 513 may send commands to instruct a computer program to perform an action on a file.

In the example of FIG. 5, the action 514 may include a computer program acting on a file. In a non-limiting example, this may include modifying or displaying the file, or sending the file to another computer program.

Upon request of a user of the WBFMS 502, the WBFMS 502 sends a file 504 along with a command structure 506 to the WBA 516 through the interface 508. The specific location where the file 504 and command structure 506 are sent is given by the command address 510, and the file 504 and command structure 506 are then forwarded to the API 513. The action 514 is then applied to the file 504 using the API of the WBA 516 in accordance with the command structure 506. The file 504 may be sent back to the WBFMS 502 through the command response address 512, and stored on the WBFMS 502. The user of the WBFMS 502 may choose to either overwrite the original file when the modified file is received, or create a new file, which may be stored on the WBFMS 502. The WBFMS 502 may impose constraints on the write privileges of the user on the files.

Figure 6:
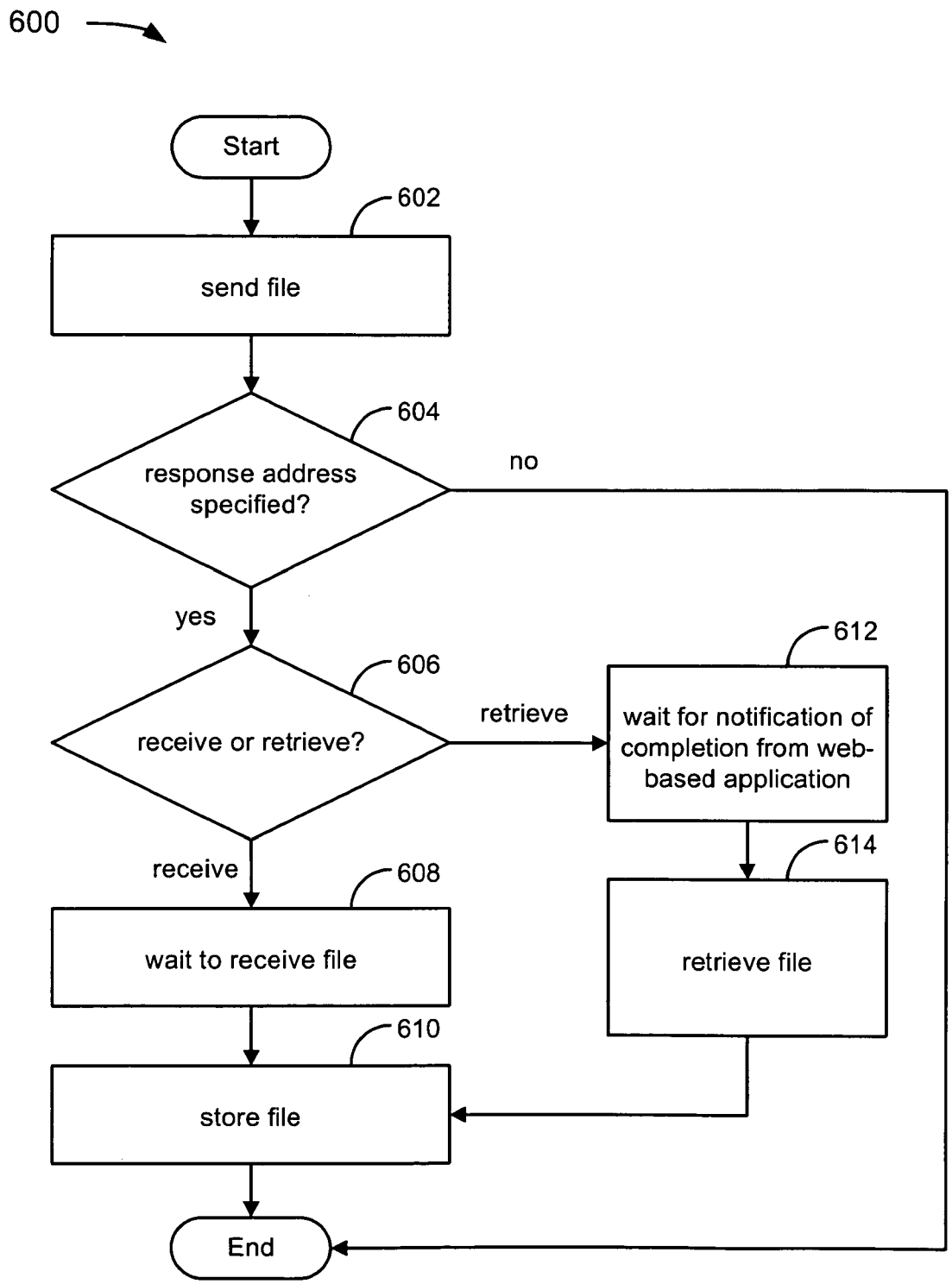
FIG. 6 depicts an example of a flowchart of a method for exchanging files between a web-based file management system and a web-based application.

FIG. 6 depicts a flowchart 600 of an example of a method for exchanging files between a web-based file management system and a web-based application.

In the example of FIG. 6, the flowchart starts at module 602 with sending a file from a WBFMS to a WBA.

In the example of FIG. 6, the flowchart continues to module 604 with determining whether a response address is specified. The response address can be specified by a developer of a WBA and can determine how the file is sent back to the WBFMS.

If the decision at module 604 is yes, then the flowchart continues to module 606 with determining whether to receive or to retrieve? The WBA may be set up to send the file back to the WBFMS upon completion of the requested action on the file. If the WBA is set up to make the file available for download upon completion of the action on the file, the WBFMS may retrieve it from the WBA.

If the decision at module 606 is receive, then the flowchart continues to module 608 with waiting to receive file. The WBFMS waits until the file has been transmitted from the WBA.

In the example of FIG. 6, the flowchart continues to module 610 with storing the file. The file may be stored by the WBFMS on any computer readable medium capable of storing data.

If the decision at module 606 is retrieve, then the flowchart continues to module 612 with waiting for notification of completion from the WBA.

In the example of FIG. 6, the flowchart continues to module 614 with retrieving the file from the WBA. The WBFMS may retrieve the file from the specified response address.

In the example of FIG. 6, the flowchart continues to module 610 with storing the file. Having stored the file on the WBFMS the flowchart terminates.

If the decision at module 604 is no, then the flowchart terminates.

Figure 7:
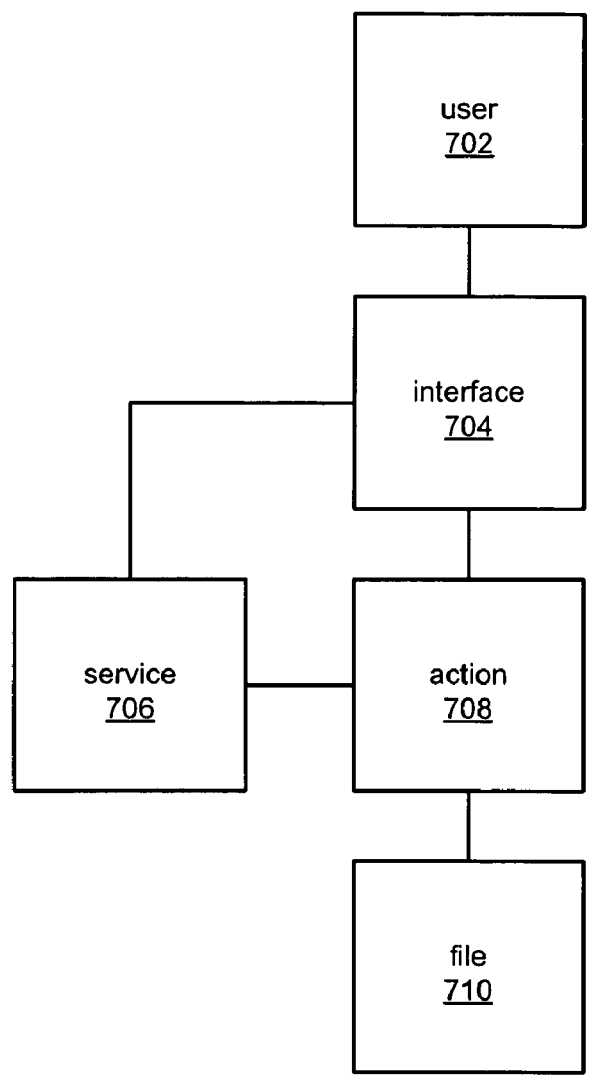
FIG. 7 depicts an example of a system for providing an action of a web-based application to one or more files of a user of a web-based file management system.

FIG. 7 depicts a diagram 700 of an example of a system for providing an action of a web-based application to one or more files of a user of a web-based file management system. FIG. 7 includes user 702, interface 704, service 706, action 708, and file 710.

In the example of FIG. 7, the user 702 may be an individual or machine acting on behalf of an individual, having access to the internet through a computing device. The user 702 may use an internet browser window, such as Internet Explorer, available from Microsoft Corporation of Redmond, Wash., or Firefox, available from Mozilla Corporation of Mountain View, Calif., to access the internet.

In the example of FIG. 7, the configuration interface 704 may be a web interface with an XHTML/HTML form wherein data can be entered.

In the example of FIG. 7, the service 706 may include information on how the service 706 will act on files. The service 706 may include more than one option to modify or display files.

In the example of FIG. 7, the action 708 may include a computer program acting on a file. In a non-limiting example, this may include modifying or displaying the file, or sending the file to another computer program.

In the example of FIG. 7, the file 710 may be a sequence of binary digits that can be read by a computer program, and can, in a non-limiting example, be presented to a user as text, image, or PowerPoint presentation.

In the example of FIG. 7, the interface 704 may include a website allowing the user 702 to access files stored on the WBFMS. The user 702 may be given the option to use the action 708, determined by the service 706, on the file 710.

In the example of FIG. 7, the user 702 may select a service and may receive a file 710, without the action 708 being requested by the user 702. An example of this would be a web-based fax service uploading received faxes to the WBFMS.

Figure 8:
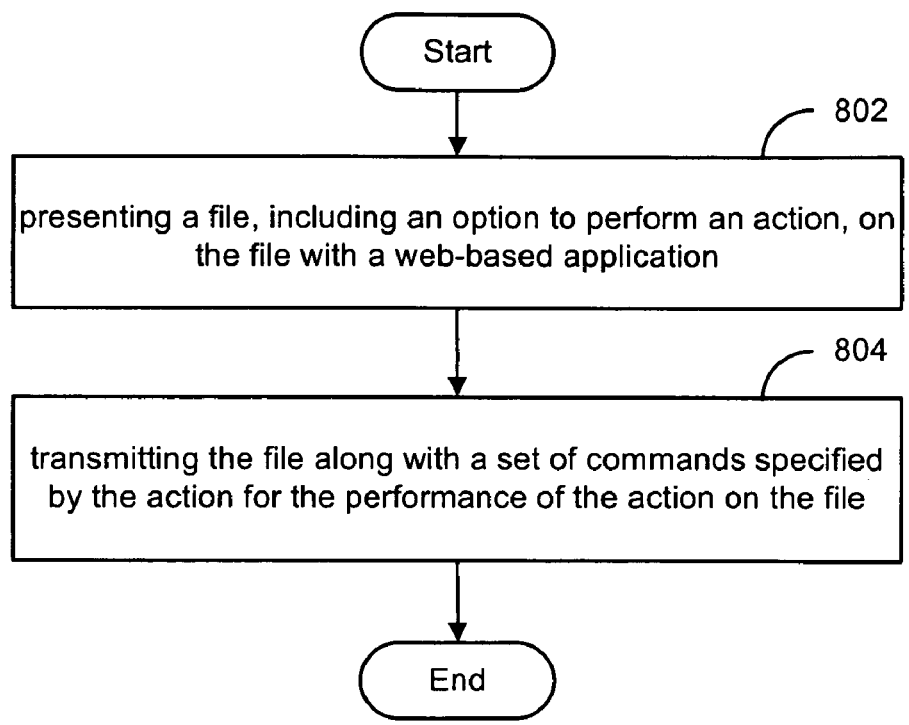
FIG. 8 depicts an example of a flowchart of a method for performing an action on a file.

FIG. 8 depicts a flowchart 800 of an example of a method for providing a user with services from a WBA.

In the example of FIG. 8, the flowchart starts at module 802 with presenting a file, including an option to perform an action on the file, with a WBA. The file may be graphically displayed to a user via, for example, a web browser. The user interface can display additional features regarding prior use of the file, enable the user to post the file to a social networking site, or display a version history of the file, and a web log history.
The option to perform the action could be graphically represented as a clickable, selectable, or otherwise chosen. In one embodiment, the WBA restricts the editing of the file to a situation when it is specified as being shared by a user.

In the example of FIG. 8, the flowchart continues to module 804 with transmitting the file along with a set of commands specified by the action for the performance of the action on the file. The commands instruct an API of a WBA to perform an action on the file. Having transmitted the file along with a set of commands, the flowchart terminates.

Figure 9:
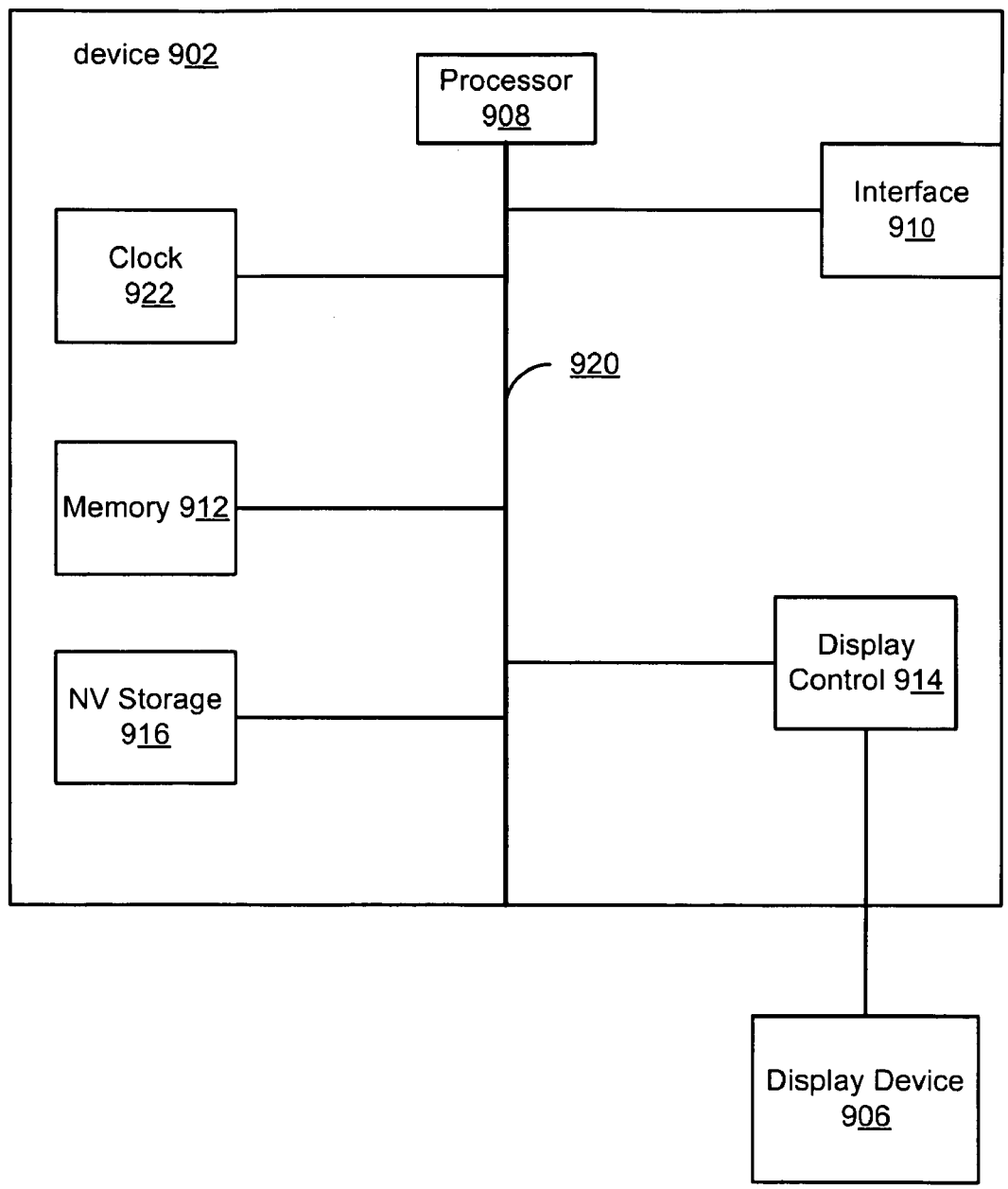
FIG. 9 depicts an example of a device for providing integration of a web-based file management system with a web-based application.

FIG. 9 depicts an example of a system 900 for integrating a web-based file management system with a web-based application through an API-agnostic method. The system 900 may be a conventional computer system that can be used as a client computer system, such as a wireless client or a workstation, or a server computer system. The system 900 includes a device 902, and a display device 906. The device 902 includes a processor 908, a communications interface 910, memory 912, display controller 914, non-volatile storage 916, clock 922. The device 902 may be coupled to or include the display device 906.

The device 902 interfaces to external systems through the communications interface 910, which may include a modem or network interface. It will be appreciated that the communications interface 910 can be considered to be part of the system 900 or a part of the device 902. The communications interface 910 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 908 may be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, and to the display controller 914.

The display controller 914 may control in the conventional manner a display on the display device 906, which can be, for example, a cathode ray tube (CRT) or liquid crystal display (LCD). The display controller 914 can be implemented with conventional well known technology.

The non-volatile storage 916 is often a magnetic hard disk, flash memory, an optical disk, or another form of storage for large amounts of data. Some of this data is often written, by a direct memory access process, into memory 912 during execution of software in the device 902. One of skill in the art will immediately recognize that the terms "machine-readable medium" or "computer-readable medium" includes any type of storage device that is accessible by the processor 908.

Clock 922 can be any kind of oscillating circuit creating an electrical signal with a precise frequency. In a non-limiting example, clock 922 could be a crystal oscillator using the mechanical resonance of vibrating crystal to generate the electrical signal.

The system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it may lack some of the features shown in FIG. 9, such as certain input or output devices. A typical computer system will usually include at least a processor, memory, and a bus coupling the memory to the processor.

In addition, the system 900 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 916 and causes the processor 908 to execute the various acts required by the operating system to input and output data and to store data in memory, including storing files on the non-volatile storage 916.

FIG. 10 depicts an example of a configuration interface, wherein a developer can enter values for a set of parameters to create a service.

In the example of FIG. 10, the WBFMS provides a web form, wherein the developer may enter values for well-defined parameters to create a service. Upon approval of the WBFMS, the service is made available to users of the WBFMS, and may be used with files stored on the WBFMS.

In the example of FIG. 10, the parameters may include general information, wherein the information provided by the developer may include the name of the service, a description of the service, an email address for support, a URL to a detailed description of the service, and an option to display the service in a public directory.

In the example of FIG. 10, the parameters may include the option to upload images and screenshots defining the service.

In the example of FIG. 10, the parameters may include the option to grant rights to other developers to edit the service.

In the example of FIG. 10, the parameters may include the option to create an action associated with the service.

Figure 11:
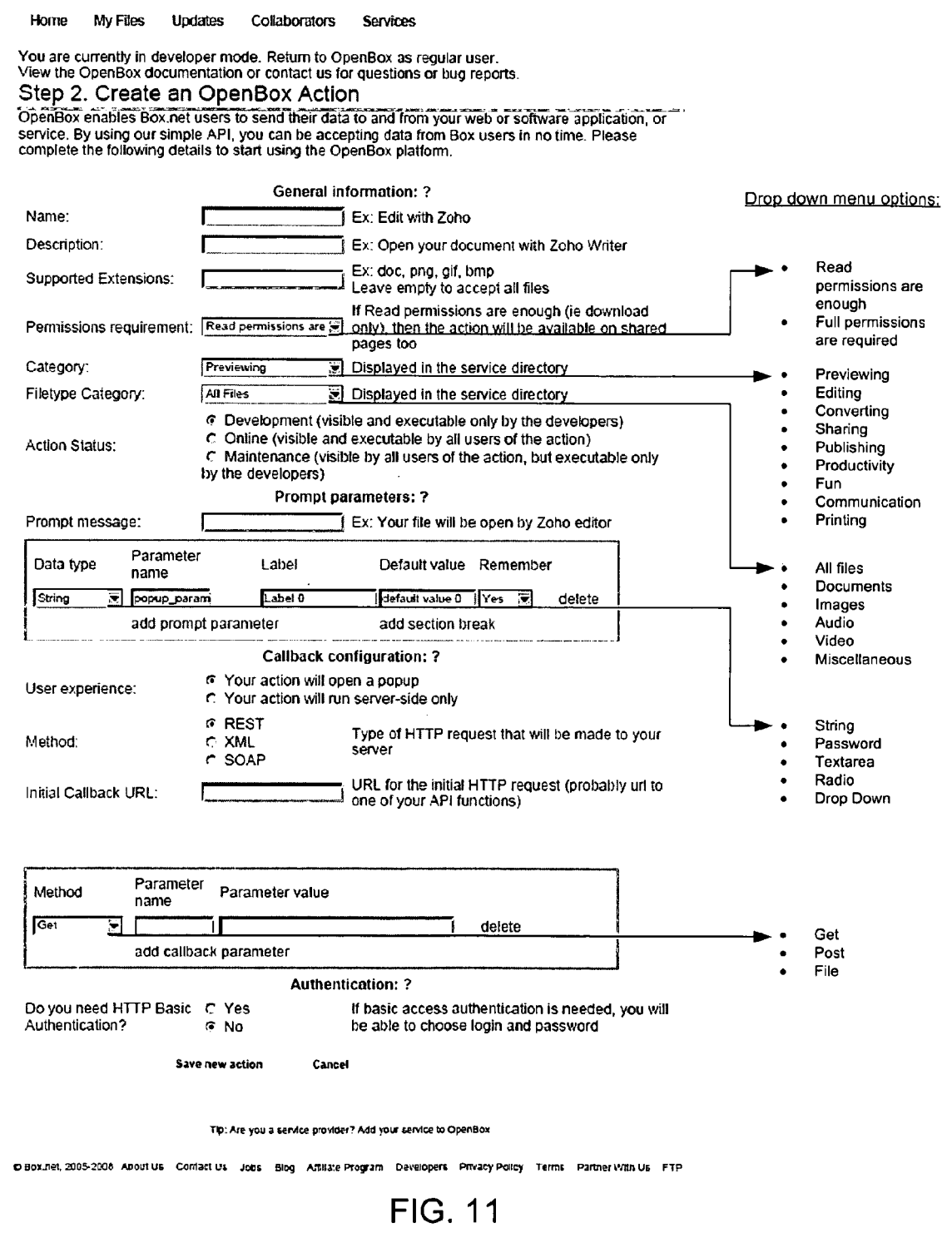

FIG. 11 depicts an example of a configuration interface, wherein a developer can enter values for a set of parameters to create an action.

In the example of FIG. 11, the parameters may include general information about the action, including: the name of action, a description of action, a list of extensions of supported files, permission information defining the availability of an action for shared files on the WBFMS, the category the action falls in, and status information defining whether the action is visible to and executable by the users of the WBFMS.

In the example of FIG. 11, the parameters may include prompt parameters, which define what is shown to the user when the user applies an action to a file stored on the WBFMS. These parameters may include a string, a password prompt, a text area, a radio button, and a drop down menu, or any combination of the above.

In the example of FIG. 11, the developer may configure callback options. These options may include an option to run the service in a new window, the language in which the WBFMS communicates with the WBA, a URL to the command address, and a URL to the command response address.

In the example of FIG. 11, the developer may define the parameters for the commands that are sent from the WBFMS to the WBA.

In the example of FIG. 11, the developer may choose to require authentication from the user of the WBFMS when the action is requested by the user.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A method of a web based file management system accessed via a website, comprising:
    providing a user interface on the website through which a user uploads a file and views the file, the website hosted by the web based file management system,
    wherein, through the user interface, the user accesses and manages the file via the web based file management system by enabling the user to perform an action on the file;
    graphically presenting options to perform the action on the file in the user interface of the website for access by the user;
    further providing, through the user interface for the website, the user with sharing capability of the file with other users of the web based file management system;

receiving, through the user interface of the website hosted by the web based file management system, a selection by the user of the action to be performed on the file;

wherein, the web based file management system further enables integration of a developer's service with the web based file management system, the developer's service being accessible for use with the file by the user via the web based file management system.

2. The method of claim 1 wherein, the user interface further enables the user to edit the file.

3. The method of claim 1 wherein, the web based file management system is accessed by the user using a wireless client.

4. The method of claim 1 further comprising restricting editing of the file by the other users to a situation when it is specified as being shared by the user.

5. The method of claim 1,
wherein, the user interface of the website which is hosted by the web based file management system, further enables the user to post the file which was uploaded to the website, to another website;
wherein, the other website is a social networking site.

6. The method of claim 1 further comprising displaying in the user interface, a prompt to the user to overwrite the existing file or create a new file.

7. The method of claim 1 further comprising displaying in the user interface, additional features regarding the prior use of the file.

8. The method of claim 1 wherein, the user interface further enables the user to send the file via fax.

9. The method of claim 1 wherein, the user interface further enables the user to make a web log entry.

10. The method of claim 1, wherein, the graphical presentation of the user interface further includes clickable or selectable features and the action includes, to organize the file into a folder, re-name, or delete the file.

11. The method of claim 1 further comprising displaying in the user interface, a version history of the file and a web log history.

12. The method of claim 11 wherein, the user interface is provided through a mobile device.

13. The method of claim 11 further comprising, displaying, to a user, a feature regarding the prior version of the file; wherein, the feature regarding the prior version of the file includes a version history.

14. The method of claim 1 further comprising displaying in the user interface, a web log history of the file.

15. The method of claim 1 further comprising, presenting the action available in a drop-down list for the file the action, including one or more of: renaming the file and deleting the file.

16. A method for providing a file management service, comprising:
providing a user interface through which a user uploads a file and views the file through the file management service,
the user interface including graphical features which are accessed by the user, the file being graphically displayed to the user in the user interface upon uploading and viewable through the user interface;
wherein, the user accesses and manages the file using the file management service which enables the user to perform an action on the file;
graphically presenting options to perform the action on the file for access by the user;
further providing, through the file management server, the user with sharing capability of the file with other users;
restricting editing of the file by other users to a situation when it is specified as being shared by the user;
receiving, a selection by the user, of the action to be performed on the file;
wherein, the file management service further enables integration of a third-party service with the file management system, the third-party service being accessible for use by the user with the file via the file management system.

17. A system for providing a web based file management service, comprising:
means for, providing a user interface through which a user uploads a file and views the file, the user interface provided by the web based file management service,
wherein, through the user interface, the user accesses and manages the file using the web based file management service by enabling the user to perform an action on the file;
means for, graphically presenting options to perform the action on the file in the user interface for access by the user;
means for, further providing, through the user interface for web-based file management service, the user with sharing capability of the file with collaborators;
means for, restricting editing of the file by the collaborators to a situation when it is specified as being shared by the user;
means for, receiving, through the user interface, a selection by the user of the action to be performed on the file;
means for, enabling integration of a developer's service with the web-based file management service, the developer's service being accessible for use with the file accessible using the web based file management service.

18. The system of claim 17 wherein, the web based file management service is accessed using a wireless client.

* * * * *